(12) United States Patent
Swanberg (10) Patent No.: US 6,840,738 B1
(45) Date of Patent: Jan. 11, 2005

(54) FEATHERING TURBINE APPARATUS

(76) Inventor: Marvin L. Swanberg, 833 N. Canterbury Ct., Sequim, WA (US) 98382-3006

( * ) Notice: Subject to any disclaimer, the term of this patent is extended or adjusted under 35 U.S.C. 154(b) by 0 days.

(21) Appl. No.: 10/818,671

(22) Filed: Apr. 6, 2004

(51) Int. Cl.$^7$ .................................................. F03D 7/04
(52) U.S. Cl. .................... 416/17; 416/108; 416/112; 416/119; 415/4.2
(58) Field of Search ................... 415/3.1, 4.1–4.4, 415/906, 907; 416/12, 17, 108, 109, 111, 112, 116, 117, 119

(56) References Cited

U.S. PATENT DOCUMENTS

| | | | |
|---|---|---|---|
| 442,402 A | * 12/1890 | Siegrist | .................... 416/112 |
| 591,775 A | 10/1897 | Peterson | |
| 618,807 A | 12/1899 | Staplin et al. | |
| 955,305 A | 4/1910 | Bailey | |
| 961,766 A | 6/1910 | Folger | |
| 1,835,018 A | * 12/1931 | Darrieus | .................... 416/119 |
| 2,006,024 A | 6/1935 | Lockwood | |
| 4,113,408 A | 9/1978 | Wurtz et al. | |
| 4,218,184 A | 8/1980 | McPherson et al. | |
| 4,494,007 A | 1/1985 | Gaston | |
| 6,179,563 B1 | * 1/2001 | Minchey | ...................... 416/17 |
| 6,543,999 B1 | 4/2003 | Polen | |
| 2003/0185666 A1 | * 10/2003 | Ursua | ....................... 415/4.2 |

* cited by examiner

*Primary Examiner*—Christopher Verdier
(74) *Attorney, Agent, or Firm*—Anthony Claiborne (57) ABSTRACT

A feathering fluid-driven turbine comprises impellers, arranged around the turbine axis and affixed to axles disposed parallel to the axis of rotation of the turbine, and further comprises a vane, such as a wind vane, which points in the current direction of fluid flow, mounted on an axis. The impellers are operatively engaged by a feathering mechanism, which, responsive to the direction indicated by the vane, rotates the impellers along their axles so that impellers on the windward side of fluid flow are aligned to present maximum aerodynamic resistance to fluid flow and impellers on the leeward side of fluid flow are aligned to present minimum aerodynamic resistance, thereby maximizing torque output of the turbine regardless of direction of fluid flow. The feathering mechanism comprises an offset cam affixed to the axis of the vane, moving in conjunction therewith as the direction of fluid flow changes. Fitted to the cam is a collar that is rotatable with the rotation of the turbine. Rocker arms linked to the collar are variably displaced during turbine rotation responsive to the offset of the cam. The rocker arms variably rotate linked impellers, thereby appropriately feathering the impellers during turbine rotation, responsive to the direction of fluid flow.

11 Claims, 5 Drawing Sheets

FEATHERING TURBINE APPARATUS

BACKGROUND OF THE INVENTION

1. Field of the Invention

This invention relates to turbine-based devices, such as windmills and water turbines, for transforming the motion of fluids into useable mechanical energy. More particularly, this invention relates to an improvement in such devices having a reaction surface feathering cycle related to the direction of fluid motion.

2. Description of the Related Art

The use of devices for obtaining useful energy from the motion of fluids in nature dates from antiquity. Such devices have long been employed to mill grain, pump water, saw lumber and provide other forms of mechanical energy. In recent times, as awareness has increased of the finite nature of fossil fuel sources, as well as of the deleterious environmental consequences of their use, devices driven by natural forces have attracted interest as sources of clean energy that are not subject to depletion. Employment of such devices presents the prospect of abundant energy production, not only directly for use in an energy grid by coupling the mechanical output of such devices to electrical generators, but also as generators of stored energy in the form of charged fuel cells or directly useable electrolytically produced hydrogen gas.

Of devices transforming fluid motion into useable mechanical energy, those devices, such as windmills and water wheels, which employ turbine mechanisms to transform fluid motion into mechanical rotation are perhaps the best known. Mechanically, such turbine-based devices may be regarded as falling into two broad categories.

One category of turbine-based device, in its operative state, presents the axis of turbine rotation substantially parallel to the direction of fluid flow. The classic western American water windmill is exemplary of devices in this category. Impellers for such devices are designed and disposed so as to optimize the angular momentum of the turbine assembly when the turbine faces the fluid flow with the axis of turbine rotation substantially in line with the direction of flow. To provide for changing flow direction, such devices typically orient the turbine in relation to fluid flow by providing a means for rotatably orienting the device about an orientation axis, the orientation axis orthogonal to the axis of turbine rotation, whereby, for optimal momentum, the axis of rotation may be oriented so as to be in line with fluid flow as flow direction changes. Elaborations on this technology, such as U.S. Pat. No. 97,136 to Tustin, adjustably orient the axis of turbine rotation out of line with the fluid, intentionally limiting efficiency of the turbine to conserve water, for example. In any case, though, because they require movement of the turbine rotation axis about an orientation axis, turbines in this category typically require additional mechanical complexity, such as differential gearing, to accommodate such movement, thereby increasing the cost and diminishing the reliability of the turbine assembly. Turbines in this category also require additional space within which to operate so that they may oriented at various times for proper alignment as flow direction changes. Because of the foregoing problems, turbines in this category are not easily adapted to large-scale operations.

Another category of turbine-base device, in its operative state, presents the axis of turbine rotation perpendicular to the plane of fluid flow. For such turbines, the orientation of the turbine axis is fixed. In the case of windmills in this category, the turbine axis is vertical.

As a turbine in this category rotates, some of its impellers will be heading in the direction of fluid flow (called "windward" herein) and some will be heading in the opposite direction (called "leeward" herein). The torque developed by such a turbine in response to fluid movement depends upon how the design of the turbine apparatus maximizes the motive effect of fluid movement on the impellers moving in the windward direction and minimizes the retarding effect of fluid movement on the impellers moving in the leeward direction.

Some turbines, such as that taught in U.S. Pat. No. 5,038,049 to Kato, employ structures or assemblies to direct fluid flow across one side of the turbine while the other side of the turbine is sheltered. Others, such as taught by Sara Jane Rollason in U.S. Pat. No. 529,197, orient a shield in response to flow direction to shelter the leeward side of the turbine. By such means, only impellers on the windward side receive motive force, and net torque is thereby imparted to the turbine. The efficiency of such devices is limited, however, because impellers on the leeward side of the turbine are nonetheless retarded by the resistance of their impeller aerodynamic profile in still fluid.

Some other turbines employ impellers which, by their design, present a low aerodynamic profile on one side and a high aerodynamic profile on the other side. For example, the turbine in U.S. Pat. No. 4,329,593 to Willmouth employs cup-like impellers in the manner of an anemometer. In such designs, the fluid resistance of the leeward tending side of the impellers, while less than that of the windward tending side, is great enough to limit turbine efficiency significantly. Yet other turbines along these lines employ airfoil type impellers, such as the Darrieus turbine, U.S. Pat. No. 1,835,018. For such impellers, fluid forces are divided into lift and drag forces, with a component of the lift force causing rotation and a component of the drag force opposing rotation. The driving torque will be positive as long as the driving component of the lift force exceeds the opposing component of the drag force. As is well appreciated by those of skill in the art, however, in systems employing Darrieus type turbines, the aerodynamic performance is poor at low wind speeds and the blades may stall at low rotational speeds. Consequently, some type of auxiliary device such as a motor must usually be employed to start the system.

To overcome these limitations in the art, various turbine designs have been employed wherein the impellers are "feathered" or moved in variable orientation, so as to be fully exposed to fluid pressure as the impellers rotate on the windward side of the turbine and to be almost entirely withdrawn from the fluid pressure as the impellers rotate on the leeward side of the turbine. In such a manner, the motive force on the windward impellers is maximized and the retarding force on the leeward impellers is minimized, thereby maximizing the torque produced by the apparatus.

For example, U.S. Pat. No. 584,986 to Chapman describes a windmill in which impellers are affixed to rotatable axes that are perpendicular to the axis of rotation of the turbine. The impellers are able to flap up from a vertical, fluid resisting position to a horizontal position lacking fluid resistance in one direction only, their movement in the opposing direction impeded by a projection integral to the panel that is engaged by a frame around the panel. Thus, impellers in Chapman are held vertical by engagement of the projection during the windward portion of their rotation and are pushed horizontal by fluid resistance on the leeward portion of their rotation. Turbines in more recent patents, such as U.S. Pat. No. 4,818,180 to Liu, employ similar fluid-driven feathering. A limitation of all such technologies is that the force necessary to cause the impellers to flap up also acts as a retarding force counteracting the motive force on the windward impellers, thereby limiting the efficiency of such turbines.

A modem approach to feathering impellers during rotation in order to maximize fluid resistance on windward impellers and minimize fluid resistance on leeward impellers is shown in U.S. Pat. No. 4,113,408 to Wurtz et al. In such turbines, impeller orientation is adjusted throughout turbine rotation by electrical or electro-mechanical means responsive to the direction of fluid flow. Thereby, impeller feathering may be optimized for maximum torque. A material limitation in this and related art, such as taught in U.S. Pat. No. 5,195,871 to Hsech-Pen, is that it relies on electro-mechanical components for operation, to the detriment of economy and reliability.

Purely mechanical feathering is arguably a more economical and reliable approach. For example, both U.S. Pat. No. 675,075 to Warren and U.S. Pat. No. 4,494,007 to Gaston employ a sprocket and chain mechanism coupled to a wind vane for controlling feathering orientation responsive to wind direction.

The turbine in U.S. Pat. No. 961,766 to Folger employs a weather vane controlled sprocket mechanism engaging all the impellers for feathering, while that in U.S. Pat. No. 955,305 to Bailey describes a feathering orientation mechanism based upon linkage between impeller axles and gearing coupling the orientation of one impeller axle with the orientation of a wind-vane.

Each of the forgoing mechanical feathering mechanisms relies on sprockets and/or chains for coordinating impeller feathering during turbine rotation. As is well known to those in the art, such mechanisms present measurable friction, impeding motion and reducing efficiency, and may be subject to failure, particularly at higher rates of turbine rotation.

Among mechanical feathering assemblies, those employing offset cam mechanics may offer less friction and greater reliability in operation than other alternatives. For example, U.S. Pat. No. 591,775 to Peterson employs an annular eccentric frame acting in the manner of an offset cam on cantilevered journals from the impellers. In Peterson, feathering is oriented according to wind direction by way of a geared linkage between a wind-vane and the annular eccentric frame, whereby the direction of eccentricity of the frame may be varied according to wind direction, thereby controlling the orientation of feathering.

U.S. Pat. No. 618,807 to Staplin et al. describes a wind engine comprising vertically oriented trough-like impellers, with feathering achieved by engagement of a spring-biased arm mechanism from the shaft or axle of each impeller with an eccentric annular groove in a sleeve around the axis of the turbine. The orientation of the sleeve (and thereby the orientation of the eccentricity of the groove in the sleeve) is determined by the orientation of a wind-vane that is directly affixed to the sleeve. The arms following the eccentric groove are displaced by that amount necessary to achieve appropriate feathering as the impellers rotate about the sleeve.

U.S. Pat. No. 4,218,184 to McPherson et al. describes windmill construction with two modes of feathering for two distinct purposes. The first mode of feathering, not highly relevant to the present invention, moves all of the impellers parallel to wind direction, for the purpose of braking the turbine mechanism. McPherson's second mode of feathering, though, comprises following the elliptical perimeter of a cardioid cam with a roller bearing on a spring-biased rocker arm operatively coupled to the impellers, thereby varying impeller orientation with turbine rotation to achieve appropriate feathering for maximizing torque.

While Staplin and MacPherson both employ a cam mechanism that may be superior to other means of feathering in efficiency and reliability, both suffer from the limitation of requiring a spring-biased mechanism with roller to follow the cam. As is well-known to those in the art, such mechanisms require periodic maintenance, such as replacement of broken or worn-out springs.

It is an object of the present invention to provide an improved fluid driven turbine with impeller feathering that maximizes torque derived from fluid flow.

It is a further object of this invention to provide a fluid driven turbine with impeller feathering that is efficient even at low fluid flow velocities.

It is a further object of this invention to provide mechanics for feathering impellers in a fluid driven turbine that are responsive to fluid flow direction.

It is a further object of this invention to provide mechanics for feathering impellers that do not rely on spring-biased mechanisms.

It is a further object of this invention to provide mechanics for feathering impellers that are reliable and efficient.

BRIEF DESCRIPTION OF THE INVENTION

The present invention is a turbine driven by moving fluids, such as wind, in which the axis of rotation of the turbine is perpendicular to the direction of fluid flow. The turbine comprises impellers arranged around the turbine axis and affixed to axles disposed parallel to the axis of rotation of the turbine. The invention further comprises a vane, such as a wind vane, which points in the current direction of fluid flow, mounted on an axis. The impellers are operatively engaged by a feathering mechanism, which, responsive to the direction indicated by the vane, rotates the impellers along their axles so that impellers on the windward side of fluid flow are aligned to present maximum aerodynamic resistance to fluid flow and impellers on the leeward side of fluid flow are aligned to present minimum aerodynamic resistance, thereby maximizing torque output of the turbine regardless of direction of fluid flow. The feathering mechanism comprises an offset cam affixed to the axis of the vane, moving in conjunction therewith as the direction of fluid flow changes. The feathering mechanism advantageously fits the cam with a collar that is rotatable with the rotation of the turbine. Rocker bars linked to the collar are variably displaced during turbine rotation responsive to the offset of the cam. Displacement of the rocker bars variably rotates linked impellers along their axles, thereby appropriately feathering the impellers during turbine rotation, responsive to the direction of fluid flow.

BRIEF DESCRIPTION OF THE DRAWINGS

Other objects, advantages, features and characteristics of the present invention, as well as methods, operation and function of related elements of structure, and the combination of parts and economies of deployment, will become apparent upon consideration of the following description and claims with reference to the accompanying drawings, all of which form a part of this specification, wherein:

DETAILED DESCRIPTION OF THE PREFERRED EMBODIMENTS

The present invention is a feathering fluid driven-turbine, whereby impellers on the windward side of fluid flow are aligned to present maximum aerodynamic resistance to fluid flow and impellers on the leeward side of fluid flow are aligned to present minimum aerodynamic resistance. An advantageously designed mechanism is employed to achieve such feathering.

Figure 1:
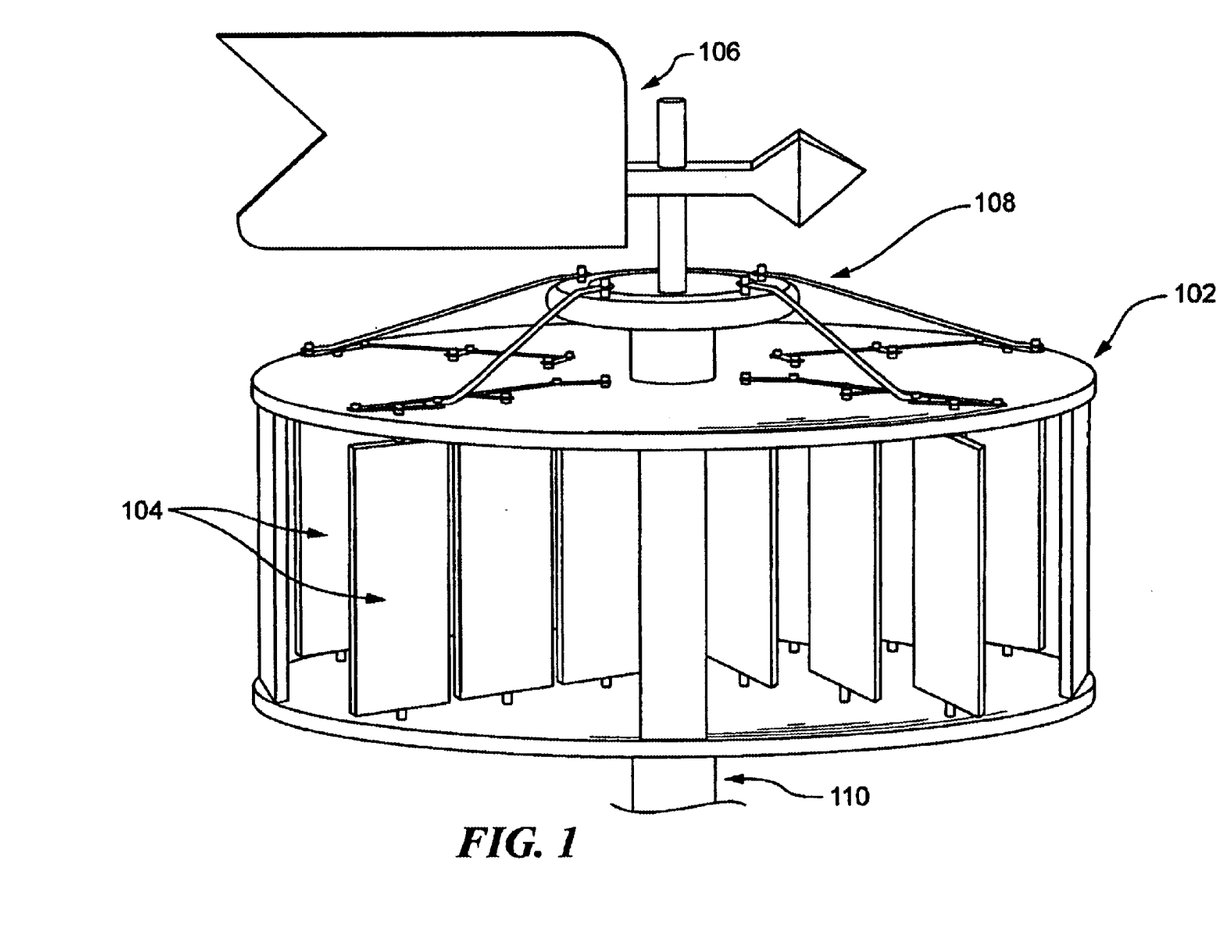
FIG. 1 is a perspective depiction of an embodiment of the present invention.

Turning to FIG. 1, illustrated is a perspective side view of an embodiment of the present invention. Turbine 102 presents impellers 104 to the flow of fluid, such as wind, water current, and the like. Vane 106 is oriented by the direction of fluid flow and is coupled to feathering mechanism 108 controlling orientation of impellers 104 as turbine 102 rotates on axis 110. As will be described in greater detail in reference to the following figures, feathering mechanism 108 is so constructed as to orient impellers 104 during rotation, responsive to the direction of fluid flow, to present maximum aerodynamic resistance when the impellers are windward and to present minimum aerodynamic resistance when they are leeward.

Figure 2:
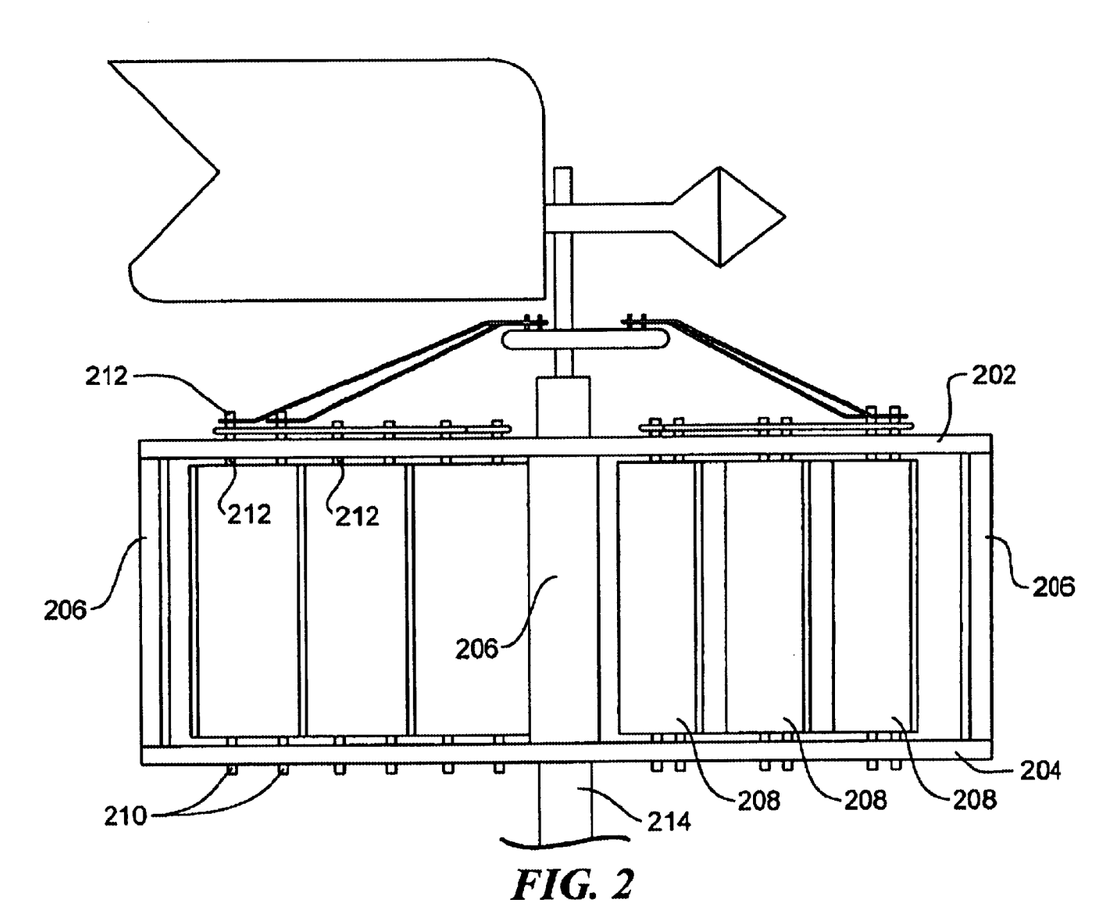
FIG. 2 is a side view of an embodiment of the present invention.

Turning now to FIG. 2, illustrated is a side view of an embodiment of the turbine, showing details of its construction. The turbine frame comprises a horizontal upper disc 202 and a horizontal lower disc 204, separated by a number of vertical struts 206 affixed therein between the discs along their perimeters. Clear to those of skill in the art, discs 202, 204 may each comprise a single integrated element such as a suitably cut and shaped piece of sheet material. Alternatively, discs 202, 204 may each comprise a plurality of component elements joined together to form discs. In any case, impellers 208 are disposed between upper disc 202 and lower disc 204, each impeller affixed to a vertical axle rotating in thrust bearing 210 in the lower disc and rotating in and projecting through sleeve bearing 212 in the upper disc. In the depicted embodiment, five sets of three impellers each are disposed along equally spaced radii of the turbine assembly.

As will be appreciated by those of skill in the art, many variations with differing numbers and arrangements of impellers may be constructed in keeping with the teaching of the present invention. In preferred embodiments, in order to maximize the torque obtained from fluid flow, impellers 208 are disposed along approximately the outer two-thirds of turbine assembly radii.

The surface area of impellers 208 may be uniform, or the surface area of an impeller may vary with the location of the impeller along the assembly radius. In preferred embodiments, impellers 208 that are disposed toward the perimeter of the turbine are fashioned with a greater surface area than those impellers 208 toward the center of the turbine, because it has been found that such an arrangement balances the wear on the impeller axles and bearings 210, 212.

Vertical rotating shaft 214 runs through the center of discs 202 and 204 and is affixed thereto. In operation, vertical shaft 214 is rotatably mounted to a base unit (not depicted) which utilizes torque on shaft 214 created by the turbine assembly for such useful output as the generation of electricity or the electrolytic production of hydrogen for fuel.

As will be clear to those of skill in the art, the turbine frame may be constructed according to a wide range of designs and from varied materials and yet still be consistent with the teachings of the present invention. For example, the functionality provided by horizontal upper and lower discs in the depicted embodiment may in alternative embodiments be provided by a suitably fashioned skeletal frame of structural bar material. Furthermore, as is clear to those of skill in the art, in preferred embodiments all parts of the turbine apparatus other than the impellers may advantageously be fashioned and disposed to present minimal resistance to the fluid during operation of the turbine. For example, referring again to FIG. 2, vertical struts 206 may be aerodynamically fashioned as an airfoil in cross-section, to present minimal fluid resistance during turbine rotation. Similarly, components of feathering mechanism 108 (FIG. 1) may be appropriately aerodynamically fashioned, or, as is clear to those of skill in the art, they may be enclosed in an appropriate aerodynamic housing (not depicted), which may be integral to upper disc 202.

Figure 3:
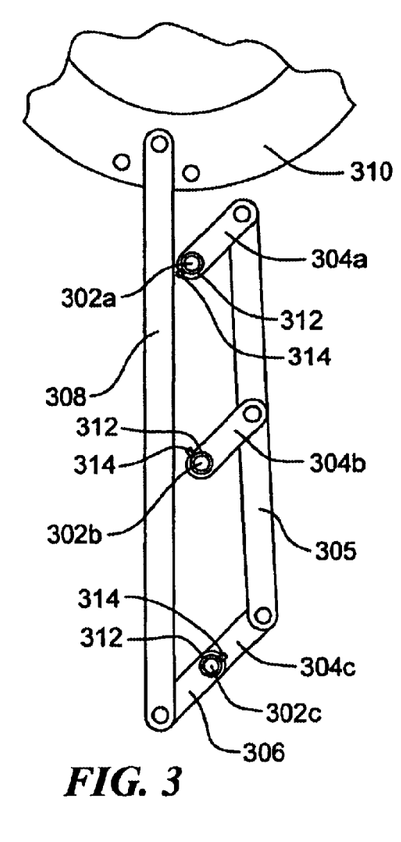
FIG. 3 is a top view of the rocker and linkage of the feathering mechanism for a set of three impellers.

Turning now to the feathering mechanism labeled 108 in FIG. 1, in FIG. 3 is depicted a top view of the rocker and linkage of the mechanism for a set of three impellers. Impeller axles 302 protruding through sleeve bearing 210 (FIG. 2) are fixed to arms 304 which are pivotally coupled to linkage bar 305, linking the orientation of the impellers (numbering three in this embodiment) along a radius of the turbine assembly. As will be appreciated by those of skill in the art, in preferred embodiments impeller axles 302 are adjustably fixed to arms 304, permitting the linked orientation of each impeller along the radius to be adjusted with precision. Such means for adjusting orientation of the impeller include, for example, a sleeve/set-screw combination affixed to arm 304 engaging axle 302. Alternatively, adjustment means may comprise a cog affixed to axle 302 cooperatively engaged with a worm-screw mechanism affixed to arm 304. It is intended that these and other mechanical means for adjusting orientation of the panels, known to those of ordinary skill in the art, are within the scope of the present invention.

Axle 302c most distal from the turbine axis is further fixed to rocker arm 306 which in turn is pivotally coupled to rocker bar 308. In some embodiments (not depicted), it has been found that providing a slotted pivotal coupling of rocker arm 306 to rocker bar 308 allows for a wider range of motion of the mechanism. Rocker bar 308 is pivotally coupled to cam collar 310. As cam collar 310 is displaced by the cam during rotation of the turbine, rocker bar 308 moves in a reciprocating motion, acting upon rocker arm 306 to rotate impeller axle 302c, which in turn pivots arm 304c and, via linkage bar 305, also rotates impeller axles 302a and 302b by leverage of arms 304a and 304b respectively. The orientation of the linked impellers is thus varied during turbine rotation as the impeller axles are pivoted by the feathering mechanism.

While the depicted embodiment illustrates a bar linked to arms on the axles as a means for linking orientation of the impellers, other means for linking impeller orientation in sets of impellers will be clear to those of skill in the art and are within the scope of the present invention. For example, referring to FIG. 3, impeller axles 302a–c may instead be affixed to cogs, which, with intervening cooperative rotatable cogs, provide linkage for orientation among the impellers. By way of further example, linkage bar 305, rather than acting on arms affixed to impeller axles, may instead be pivotally coupled directly to sides of panels in the interior of the turbine. It is intended that the present invention encompass all such mechanical means of linking the orientation of sets of impellers known to those of ordinary skill in the art.

Figure 4:
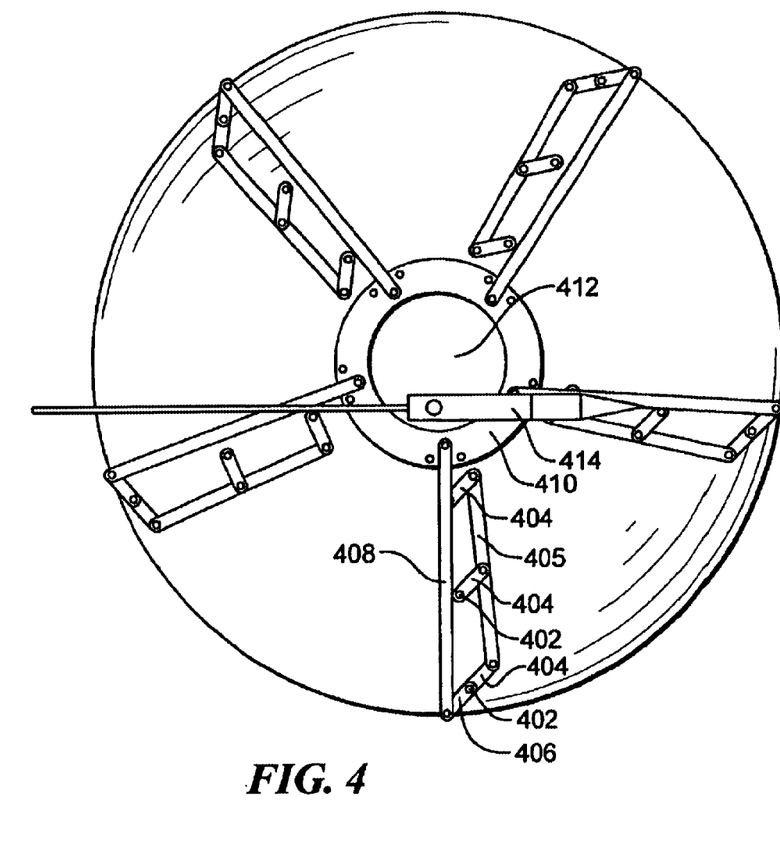
FIG. 4 is a top view of the entire feathering mechanism.

FIG. 4 depicts a top view of the entire feathering mechanism. In numbering analogous to that used in reference to FIG. 3 above, impeller axles 402 are fixed to arms 404 which are pivotally coupled to linkage bar 405, linking the orientation of the impellers along each radius of the assembly. The most distal axle 402 is further fixed to rocker arm 406 which is pivotally coupled to rocker bar 408, which in turn is pivotally coupled to cam collar 410. Offset cam 412 is affixed to vane 414, the orientation of the offset of cam 412 at any time determined by the orientation of vane 414 independent of rotation of the turbine assembly. As the assembly rotates about offset cam 412, the varying displacement of collar 410 causes reciprocation of rocker bar 408, causing linked rotating of impeller axles 402, thereby providing feathering of the impellers appropriate for the direction of fluid flow as determined by vane 414.

Figure 5:
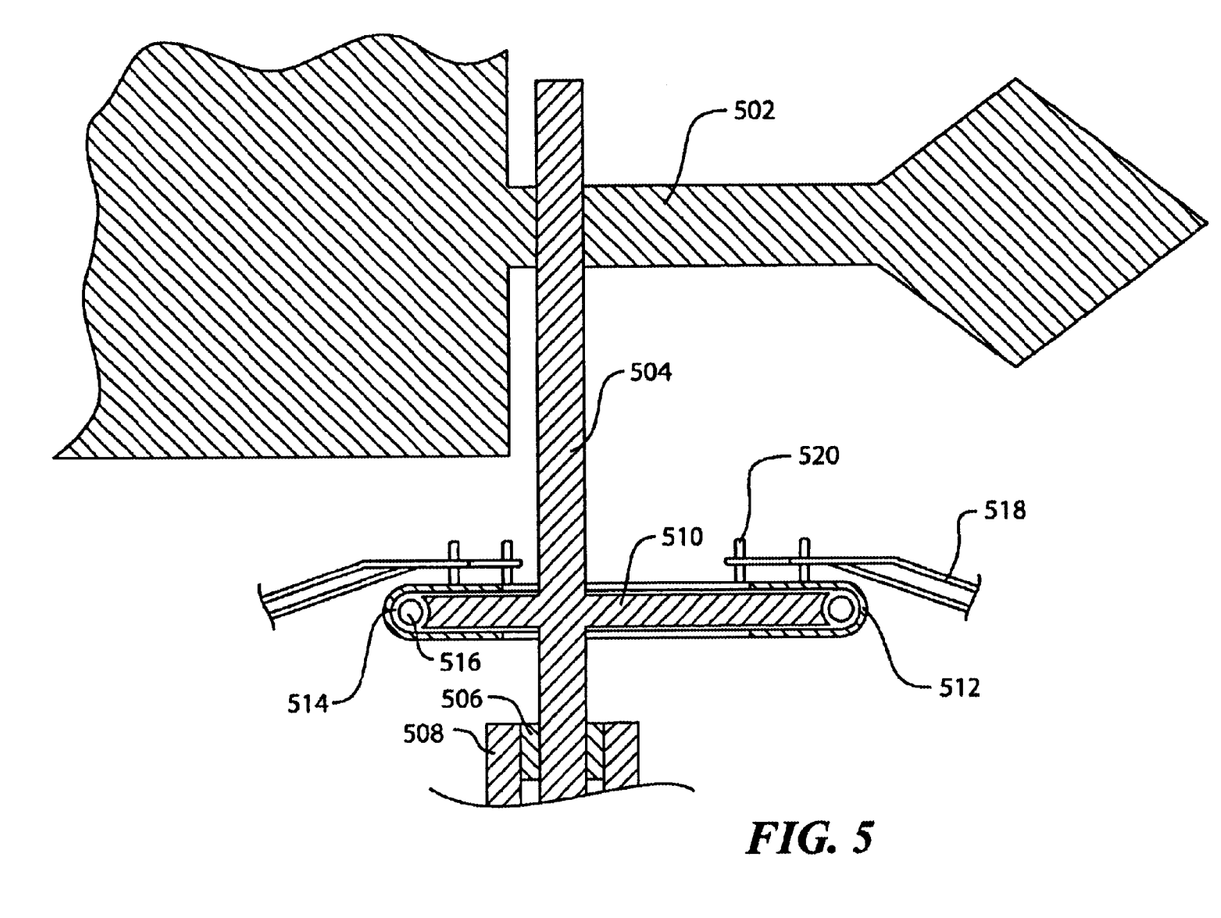
FIG. 5 is a cut-away side view of the feathering mechanism, showing the vane with shaft affixed to an offset cam fitted with a rotatable collar.

FIG. 5 depicts a cut-away view of an embodiment of the offset cam mechanism, showing the cooperation between the vane, the cam and the cam collar. Vane 502 is affixed to vane shaft 504 which is rotatably seated in thrust bearing 506 mounted atop turbine shaft 508. Offset cam 510 is affixed to vane shaft 504 by any number of means known to those of skill in the art, for example by welding, integral casting or sleeve/set-screw combination. Cam collar 512 is rotatably seated on cam 510 via annular bearing races 514 populated by ball bearings 516. Vane shaft 504 passes through an aperture in the center of cam collar 512 that is of sufficient size that the cam collar does not come into contact with the vane shaft during operation of the apparatus. Rocker bars 518 are pivotally connected to cam collar 512 via pivots 520.

Other embodiments may have different bearing arrangements between cam 510 and rotatable cam collar 512. For example, instead of or in addition to the annulus of ball bearings around the perimeter of the offset cam, there may be an annular bearing race on the upper and/or lower surface of the cam cooperating with an appropriately crafted race on the inner surface of the cam collar. By way of further example, instead of fitting around the both upper and lower surfaces of the cam, as illustrated, the cam collar may simply slip over the top and sides of the cam in the manner of a cup. As indicated by these examples and as will be clear to those of skill in the art, the bearing arrangement between cam 510 and rotatable cam collar 512 may be varied considerably and still be within the scope of the present invention.

Figure 6:
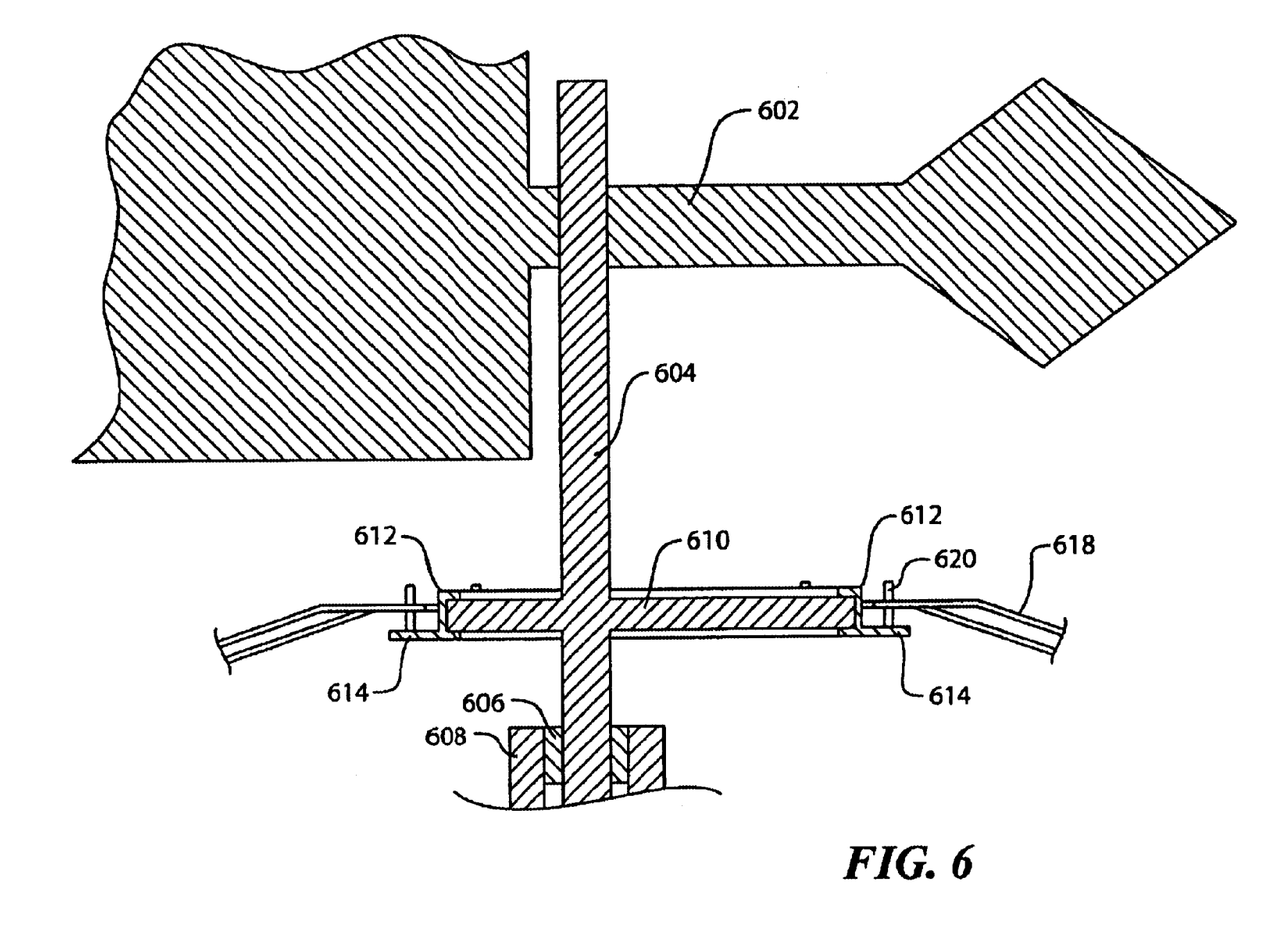
FIG. 6 is a cut-away side view of an alternative embodiment of the feathering mechanism

In salt water marine environments, the ball bearing arrangement of the embodiment illustrated in reference to FIG. 5 may not be suitable because of inevitable environmental corrosion and electrolytic degradation of ball bearing material. Referring now to FIG. 6, another arrangement between the cam and the rotatable cam collar is shown. In the depicted embodiment, cam 610 is shaped in the manner of a pulley-wheel, and cam collar 612, preferably comprised of non-degradable material such as stainless steel or nylon, is fashioned as a vertical cylinder disposed rotatably about cam 610 with an integral horizontal annular lip 614 to which rocker bars 618 are pivotally connected via pivots 620.

In any case, essential to the operation of the apparatus is that the vane/offset cam assembly remain more or less stationary with the direction of fluid flow while the cam collar rotates with the rotation of the turbine. As will be appreciated by those of skill in the art, such operation is favored when the friction on the vane shaft thrust bearing and the cam collar annular bearing is low and when the resistance of displacement of the vane from the direction of fluid flow is high. Preferred embodiments therefore deploy relatively frictionless bearings as well as vanes of relatively large trailing aerodynamic profile.

Many variations and elaborations of the forgoing embodiments are possible in keeping with the spirit of the present invention. For example, a mechanical stop means affixed to one or both of the upper and lower discs may be used to restrain each impeller at extreme positions, such as when the impeller is in the windward position, thereby relieving strain on the feathering mechanism. Such stop means may be simply a physical projection from the disk that encounters the leading edge of an impeller in the windward position. Stop means may instead be a restraint acting upon the impeller axle, such as a projection from the disc that encounters the affixed feathering mechanism arm when the arm is in the extreme position correlating with windward presentation of the impeller. As will be clear to those in the art, stop means may, in fact, be any of numerous contrivances known in the art that can act upon one or another of the cooperating parts of the impellers and the feathering mechanism to restrain the impellers when they are under maximum strain.

CONCLUSIONS, RAMIFICATIONS, AND SCOPE

Accordingly, it can be seen that the invention described herein provides a fluid-driven turbine with a feathering mechanism, which, responsive to the direction indicated by the vane, orients the turbine impellers so that impellers on the windward side of fluid flow are aligned to present maximum aerodynamic resistance to fluid flow and impellers on the leeward side of fluid flow are aligned to present minimum aerodynamic resistance, thereby maximizing torque output of the turbine regardless of direction of fluid flow. Furthermore, the feathering mechanism of the present invention is efficient and reliable and does not employ a spring-bias to follow displacement of the cam. Yet further, because of its efficiency and, in preferred embodiments, low friction operation, the present invention provides useful mechanical energy even at very low fluid flow rates.

As will be clear to those of skill in the art, the present invention is suitable for a wide range of fluid-driven applications. Because its feathering technology is particularly adapted to maximize torque regardless of the direction of fluid flow, the present invention may be advantageously employed on a mobile or temporary basis for power generation, particularly the electrolytic production of hydrogen, and for other purposes. In addition, particularly relevant to the marine environment, the present invention is effective when operationally mounted on a floating support in a permanent installation. For example, water driven turbine assemblies may be operationally employed between barges or floats located outside navigational routes, either in open water or, preferably, at entrances and discharges of bays and inlets where swifter and more concentrated water flow is available. Furthermore, wind-driven embodiments may be deployed on barges or floats as needed in areas where strong winds are prevalent.

Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

I claim:

1. A feathering turbine apparatus driven by fluid flow, comprising
    a turbine frame rotatable about a first axis that is substantially perpendicular to the direction of fluid flow;
    a plurality of fluid-driven impeller blades disposed substantially within the frame for orbitally rotating about the first axis;
    each of said blades having a blade axle about which the blade may pivot, each axle mounted pivotingly within the frame, the blade pivoting about a second axis of orientation substantially parallel to the first axis;
    a vane that rotates about a third axis for indicating direction of fluid flow; and
    a feathering mechanism, comprising:
        an offset cam coupled with the vane to rotate about the third axis responsive to direction of fluid flow;
        a cam collar rotatably disposed around the offset cam, the cam collar rotating with the turbine frame;
        a plurality of rockers pivotingly mounted to the cam collar, the rockers further coupled to the blade axles to vary orientation of each blade along the second axis with rocker displacement;
    whereby, as the turbine rotates, the cam collar rotates about the cam and the rockers are displaced by the cam offset, the feathering mechanism thereby varying blade orientation during turbine rotation to maximize the torque obtained from fluid flow.

2. A feathering turbine apparatus according to claim 1, further comprising
    a means for adjusting the orientation of an impeller blade relative to the orientation of other impeller blades.

3. A feathering turbine apparatus according to claim 1, wherein
    the impeller blades are disposed in a plurality of sets, each set comprised of a plurality of blades disposed along a radius of the frame perpendicular to the first axis.

4. A feathering turbine apparatus according to claim 3, further comprising
    a means for linking the impeller blades in a set so that each blade in the set assumes substantially the same orientation.

5. A feathering turbine apparatus according to claim 3, further comprising
    a means for adjusting the orientation of an impeller blade relative to the orientation of other impeller blades in its set.

6. A feathering turbine apparatus according to claim 1, further comprising
    a means for restraining the rotation of an impeller blade when the blade is in the windward position.

7. A feathering fluid-driven turbine apparatus, comprising
    a cylindrical frame, comprised of parallel top and bottom discs, separated by struts affixed therein between along the perimeter of the discs, rotatable about a first axis running through the center of the discs;
    a first axle, rotatable in a base unit for utilizing torque, affixed to the frame along the first axis;
    a plurality of impeller blades arranged in sets, each blade affixed to an impeller axle, the impeller axle having a top extension and a bottom extension, the bottom extension rotatably seated in a thrust bearing disposed in the bottom disc, and the top extension rotatably seated in and passing through a sleeve bearing disposed in the top disc, the impeller axle rotatable along a second axis substantially parallel to the first axis;
    a linkage arm affixed to the top extension of each impeller axle;
    a linkage bar for each set of impeller blades, pivotingly engaging the linkage arms affixed to axles of impeller blades in the set, linking the orientation of impeller blades in the set;
    a vane that rotates about a third axis for indicating direction of fluid flow;
    an offset cam coupled with the vane to rotate about the third axis responsive to direction of fluid flow;
    a cam collar rotatably disposed around the offset cam, the cam collar rotating with the turbine frame;
    for each set of impellers, a rocker bar pivotingly connected to the cam collar, the rocker bar further pivotingly engaging a rocker arm affixed to the top extension of one impeller axle in the set;
    whereby, as the turbine rotates about the first axis, the cam collar rotates about the cam and the rocker bars are displaced by the cam offset, the displacement of the rocker bar for each set of impeller blades rotating and orienting the impeller axle affixed to the rocker arm connected to the rocker bar, the other impeller axles in the set likewise rotating by way of the affixed linkage arms pivotingly connected to the linkage bar, varying blade orientation within each set of blades during turbine rotation responsive to the direction of fluid flow and thereby maximizing the torque derived from fluid flow and imparted upon the base unit by the first axle.

8. A feathering fluid-driven turbine according to claim 7, further comprising
    a means for adjusting the orientation of an impeller blade relative to the orientation of the other blades in its set.

9. A feathering fluid-driven turbine according to claim 7, wherein each set of impeller blades is disposed along a radius of the discs.

10. A feathering fluid-driven turbine according to claim 7, further comprising a means of restraining the rotation of impellers when they are in the windward position.

11. A feathering fluid-driven turbine according to claim 7, wherein each set of impeller blades is comprised of three blades.

* * * * *